(12) United States Patent
Ningrat et al.

(10) Patent No.: US 10,528,191 B2
(45) Date of Patent: *Jan. 7, 2020

(54) MUTUAL CAPACITANCE SENSING USING MAGNITUDE NOISE SENSING WITH TRIGONOMETRIC MULTIPLIERS

(71) Applicant: STMicroelectronics Asia Pacific Pte Ltd, Singapore (SG)

(72) Inventors: Kusuma Adi Ningrat, Singapore (SG); Ade Putra, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,205

(22) Filed: May 8, 2019

(65) Prior Publication Data

US 2019/0265837 A1    Aug. 29, 2019

Related U.S. Application Data

(63) Continuation of application No. 15/873,973, filed on Jan. 18, 2018, now Pat. No. 10,338,746.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0414* (2013.01)

(58) Field of Classification Search
CPC ......... G06F 3/041; G06F 3/0418; G06F 3/044
USPC ...................... 178/18.01–19.07; 345/173–178
See application file for complete search history.

(56) References Cited

U.S. PATENT DOCUMENTS

2010/0097078 A1    4/2010   Philipp et al.
2015/0220170 A1    8/2015   Nam et al.
2015/0309658 A1   10/2015   Stevenson et al.

*Primary Examiner* — Michael Pervan
(74) *Attorney, Agent, or Firm* — Crowe & Dunlevy

(57) ABSTRACT

A touch screen controller includes drive circuitry driving force lines with a force signal in a touch data sensing mode and not driving the force lines in a noise sensing mode, sense circuitry sensing touch data at the sense lines in the touch data sensing mode and sensing noise data at the sense lines during the noise sensing mode. Processing circuitry: a) samples the noise data, b) performs trigonometric manipulations of the noise data to produce imaginary noise data and real noise data, and c) determines a noise magnitude value of the noise data as a function of the imaginary noise data and the real noise data. In the noise sensing mode, (a)-(c) are performed for each of a plurality of possible sampling frequencies to be used in the touch data sensing mode in order to determine which sampling frequency is to be used in the touch data sensing mode.

17 Claims, 8 Drawing Sheets

MUTUAL CAPACITANCE SENSING USING MAGNITUDE NOISE SENSING WITH TRIGONOMETRIC MULTIPLIERS

CROSS-REFERENCE TO RELATED APPLICATION

This application is a continuation of U.S. application Ser. No. 15/873,973, filed Jan. 18, 2018, the contents of which are incorporated by reference to the maximum extent allowable under the law.

TECHNICAL FIELD

This disclosure is related to the field of capacitive touch sensing and, in particular, to techniques for improving noise sensing in mutual capacitance sensing through the use of a sampling technique involving trigonometric manipulations of sampled signals.

BACKGROUND

A touch screen is a device that can detect an object in contact with or in proximity to a display area. The display area can be covered with a touch-sensitive matrix that can detect a user's touch by way of a finger or stylus, for example. Touch screens are used in various applications such as mobile phones and other mobile devices. A touch screen may enable various types of user input, such as touch selection of items on the screen or alphanumeric input via a displayed virtual keypad. Touch screens can measure various parameters of the user's touch, such as the location, duration, etc.

One type of touch screen is a capacitive touch screen. A capacitive touch screen may include a matrix of conductive rows and conductive columns overlaid on the display area. The conductive rows and the conductive columns are spaced apart from one another so as to not make contact. The capacitive touch screen may be used for mutual capacitance sensing.

In mutual capacitance sensing, the capacitance between each row and column of the matrix may be sensed. A change in the sensed capacitance between a row and a column may indicate that an object, such as a finger, is touching the screen or is in proximity to the screen near the region of intersection of the row and column. Mutual capacitance sensing circuits employ a "forcing" signal applied to a column conductor of the capacitive touch matrix and sensing of the coupled signal on respective row conductors (or vice-versa).

To perform noise sensing in mutual capacitance sensing, so as to be able to determine a best available frequency for the mutual capacitance sensing, the row conductors are sensed without the application of the force signal to the column conductors, at multiple frequencies. The frequency with the lowest noise level is then used for the next mutual capacitance sensing during which the forcing signal is applied to the column conductor.

While this noise sensing technique does work, noise data is not available every data frame, and the noise itself may change significantly from frame to frame. Therefore, improvement in the area of noise sensing in mutual capacitance sensing is needed.

SUMMARY

Disclosed herein is a touch screen controller operable with a touch screen having force lines and sense lines. The touch screen controller includes drive circuitry configured to drive the force lines with a force signal in a touch data sensing mode and to not drive the force lines in a noise sensing mode, and sense circuitry configured to sense data at the sense lines. Processing circuitry is configured, for a plurality of frames, during a noise sensing sub-frame, perform steps of sampling the data at a plurality of different possible sampling frequencies, multiplying the data sampled at each of the plurality of different possible sampling frequencies by a sine multiplier to produce imaginary noise data for each of the plurality of different possible sampling frequencies, summing the imaginary noise data for each of the plurality of different possible sampling frequencies to produce a separate sum for each of the plurality of different possible sampling frequencies, multiplying the data at each of the plurality of different possible sampling frequencies by a cosine multiplier to produce real noise data for each of the plurality of different possible sampling frequencies, summing the real noise data for each of the plurality of different possible sampling frequencies to produce a separate sum for each of the plurality of different possible sampling frequencies, and determining separate noise magnitude values of the data for each of the plurality of different possible sampling frequencies as a function of the summed imaginary noise data and the summed real noise data.

The processing circuitry may also be configured to perform a step of selecting a sampling frequency for a next frame based upon the separate noise magnitude values of the data for each of the plurality of different possible sampling frequencies of two or more of the plurality of frames.

The processing circuitry may also be configured to perform a step of determining a standard deviation of each of the different possible sampling frequencies over two or more of the plurality of frames, based upon the separate noise magnitude values of the data for each of the plurality of different possible sampling frequencies as determined during each of the two or more of the plurality of frames. The processing circuitry may also configured to perform a step of selecting a sampling frequency for a next frame based upon the standard deviation of each of the different possible sampling frequencies.

The processing circuitry may select the sampling frequency for the next frame based upon which of each of the different possible sampling frequencies has a lowest standard deviation.

The processing circuitry may also be configured to, for each frame, during a touch data sensing sub-frame, perform steps of sampling the data at a sampling frequency, multiplying the data by a sine multiplier to produce imaginary touch data, summing the imaginary touch data, multiplying the data by a cosine multiplier to produce real touch data, summing the real touch data, and determining a touch magnitude value of the data as a function of the summed imaginary touch data and the summed real touch data.

The plurality of different possible sampling frequencies may include four possible sampling frequencies.

The plurality of frames may include sixteen frames.

Also disclosed herein is a method including for each of a plurality of frames, placing a touch sensing screen into a noise sensing mode by not driving force lines of the touch sensing screen yet sensing noise data at sense lines of the touch sensing screen. In a noise sensing sub-frame of each of the plurality of frames, the method includes performing steps of: (a) sampling the noise data, (b) performing trigonometric manipulations of the noise data to produce imaginary noise data and real noise data, and (c) determining a noise magnitude value of the noise data as a function of the imaginary noise data and the real noise data.

In each noise sensing sub-frame, steps (a)-(c) may be performed for each of a plurality of possible sampling frequencies to be used in a touch data sensing mode. A standard deviation of the noise magnitude values, across each of the noise sensing sub-frames, of each of the plurality of possible sampling frequencies may be determined. The touch sensing screen may be placed into the touch data sensing mode, and touch data may be sampled at the frequency of the plurality of possible sampling frequencies having a lowest standard deviation across each of the noise sensing sub-frames.

In a touch data sensing sub-frame of each of the plurality of frames, the following steps may also be performed: sampling the touch data; performing trigonometric manipulations of the touch data to produce imaginary touch data and real touch data; and determining a magnitude value of the touch data as a function of the imaginary touch data and real touch data. Coordinates of a touch to the touch sensing screen may be determined as a function of the magnitude values for each of the touch data sensing sub-frames.

Another device aspect disclosed herein is directed to a touch screen controller operable with a touch screen having force lines and sense lines. The touch screen controller includes drive circuitry configured to drive the force lines with a force signal in a touch data sensing mode and to not drive the force lines in a noise sensing mode, sense circuitry configured to sense touch data at the sense lines in the touch data sensing mode and to sense noise data at the sense lines during the noise sensing mode, and processing circuitry. The processing circuitry is configured to, in the noise sensing mode, perform steps of: (a) sampling the noise data; (b) performing trigonometric manipulations of the noise data to produce imaginary noise data and real noise data; and (c) determining a noise magnitude value of the noise data as a function of the imaginary noise data and the real noise data.

The processing circuitry may be further configured to in the noise sensing mode, perform steps (a)-(c) for each of a plurality of possible sampling frequencies to be used in the touch data sensing mode, and to determine which of the plurality of possible sampling frequencies is to be used by the sense circuitry in a later entry into the touch data sensing mode.

The processing circuitry may determine which of the plurality of possible sampling frequencies is to be used by the sense circuitry in the later entry into the touch data sensing mode by selecting the frequency of the plurality of possible sampling frequencies that has a lowest standard deviation.

The processing circuitry may be configured to, for each of a plurality of data frames, in the noise sensing mode, perform steps (a)-(c) for each of a plurality of possible sampling frequencies to be used in the touch data sensing mode in that data frame so as to determine a noise magnitude value of the noise data in each data frame.

The processing circuitry may determine which of the plurality of possible sampling frequencies is to be used by the sense circuitry upon exit of the noise sensing mode and into a later entry into the touch data sensing mode by selecting the frequency of the plurality of possible sampling frequencies that has a lowest standard deviation The processing circuitry may be configured to, in the touch data sensing mode, sample the touch data, perform trigonometric manipulations of the touch data to produce imaginary touch data and real touch data, and determine a magnitude value of the touch data as a function of the imaginary touch data and real touch data.

BRIEF DESCRIPTION OF THE DRAWINGS

For a better understanding of the described embodiments, reference is made to the accompanying drawings, which are incorporated herein by reference and in which.

DETAILED DESCRIPTION

Figure 1A:
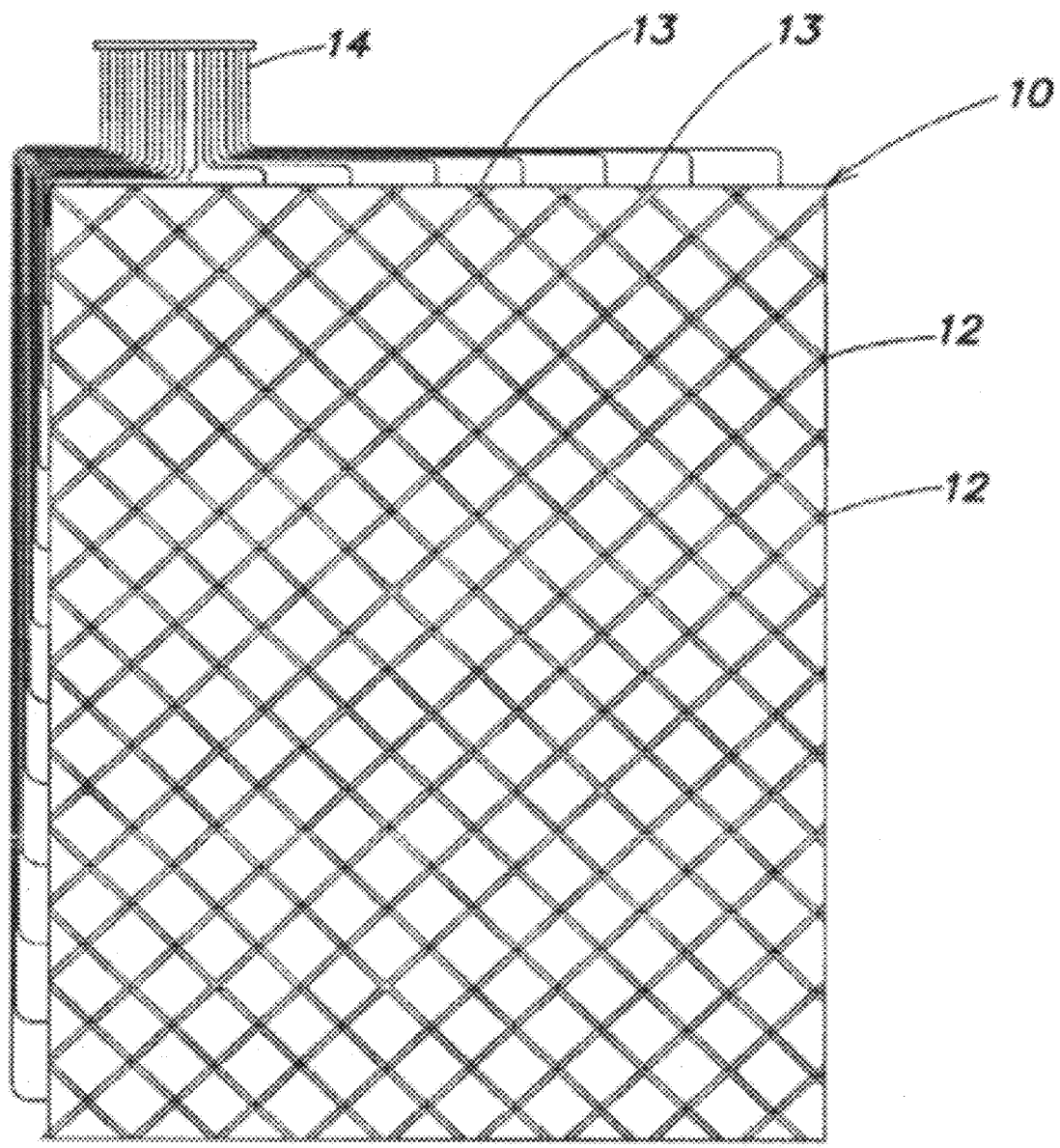
FIG. 1A is a schematic representation of a capacitive touch matrix.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed.

Shown in FIG. 1A is an example of a touch screen having conductive rows 12 and conductive columns 13 of a capacitive touch matrix 10, arranged in a diamond pattern. The capacitive touch matrix 10 may be transparent to allow light from an underlying display unit to pass through the capacitive touch matrix 10 for viewing by a user. A plurality of conductors 14 may be provided for making contact to conductive rows 12 and conductive columns 13. Conductive rows 12 and conductive columns 13 may cover substantially the entire face of the touch screen, enabling touch and proximity detection at substantially any location on the touch screen.

Figure 1B:
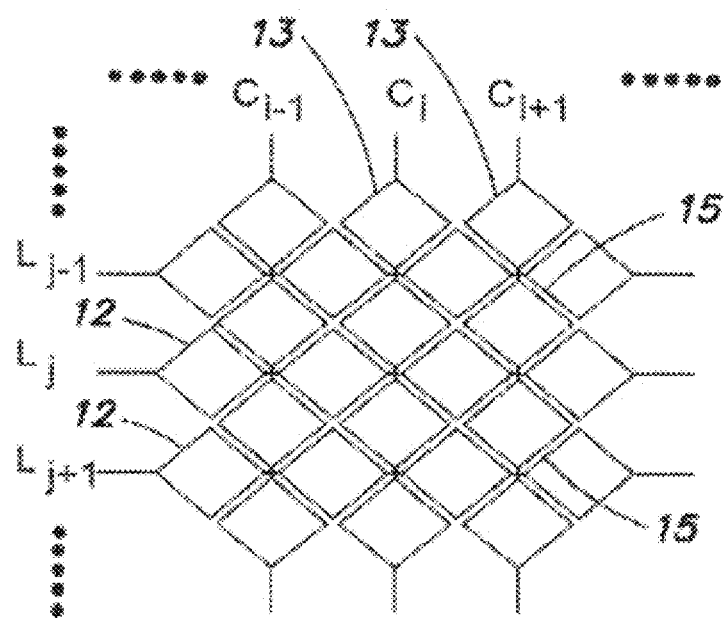
FIG. 1B is an enlarged schematic diagram of a portion of the capacitive touch matrix, showing row and column conductors having diamond configurations.

Shown in FIG. 1B is an enlarged portion of the capacitive touch matrix 10 in further detail. The capacitive touch matrix 10 includes a plurality of conductive columns 13 ($C_i$)

and a plurality of conductive rows 12 (Lj). The conductive columns 13 extend vertically and the conductive rows 12 extend horizontally in FIG. 1B. The conductive rows 12 and the conductive columns 13 cross above or below each other at their intersection points, but are not in contact with one another. Each of the conductive rows 12 and the conductive columns 13 has conductors arranged in a diamond pattern. As a result, the conductive rows 12 and the conductive columns 13 are separated from each other by capacitive gaps 15. The diamond pattern may provide increased capacitance between conductive rows 12 and conductive columns 13, as compared with straight conductors. Capacitive touch matrix 10 may sense an object that modifies the fringing electric field above the capacitive gaps 15 when the object is in contact with or in proximity to the screen.

Figure 1C:
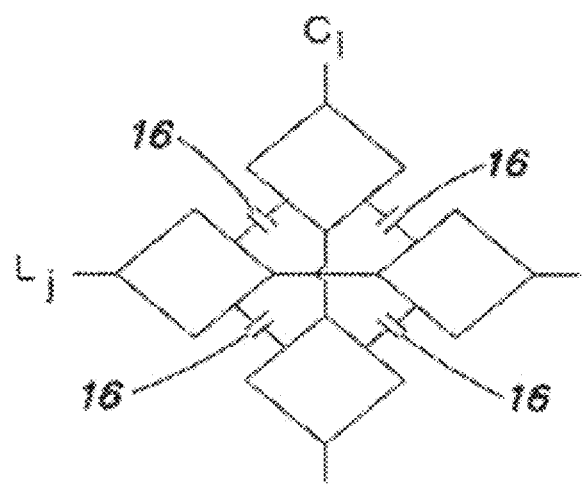
FIG. 1C is a schematic diagram of a single intersection of a row and column, illustrating capacitances between row and column conductors.

FIG. 1C shows that when a conductive column Ci and a conductive row Lj are selected, the total capacitance between column Ci and row Lj is the sum of four capacitances 16 between the four adjacent diamond-shaped regions of column Ci and row Lj. The capacitance between column Ci and row Lj can be sensed to determine whether an object is in contact with or in proximity to the touch screen above the region in which the four capacitances 16 are formed. Each conductive row 12 and conductive column 13 of the capacitive touch matrix may be selected in succession to sense the capacitances at each position of the touch screen.

Figure 2:
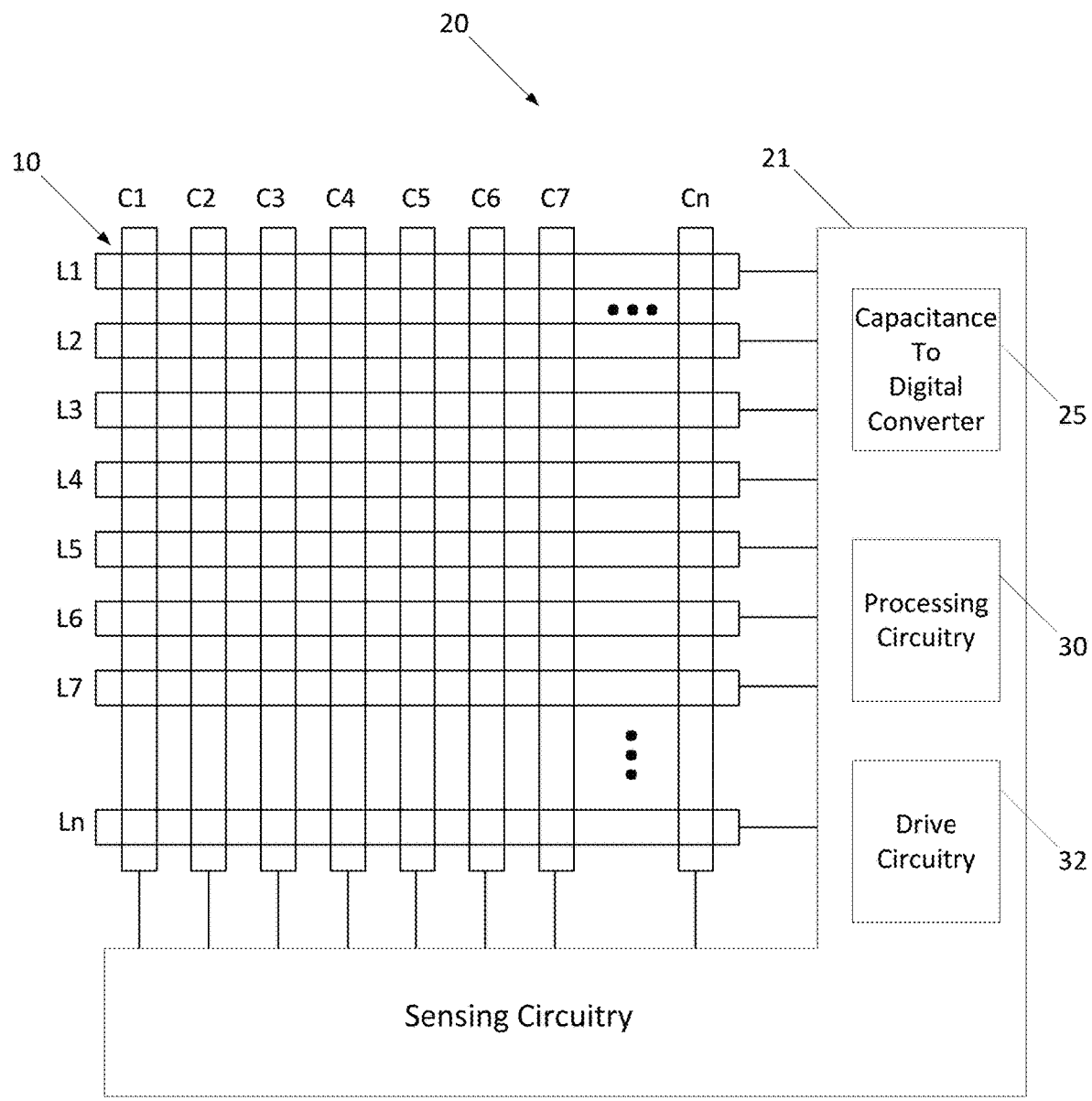
FIG. 2 is a schematic diagram of a touch screen system.

Depicted in FIG. 2 is a block diagram of a touch screen system 20 that includes the capacitive touch matrix 10 and an associated sensing circuit 21. As discussed above, the capacitive touch matrix 10 may have a diamond pattern, which is not shown in FIG. 2 for clarity. The sensing circuit 21 includes a capacitance-to-digital converter 25 to sense charge from the capacitive touch matrix 10, and processing circuitry 30 to process the converted charge so as to determine a coordinate of the touch, as discussed below.

In general, in mutual capacitance sensing, a forcing signal is applied to a column conductor (or to a row conductor) by drive circuitry 32, and a coupled signal is sensed on one or more row conductors (or column conductors). The rows and columns of the capacitive touch matrix 10 may be scanned in any suitable manner, such as will be described below. For example, the capacitance may be sensed between column C1 and rows L1-Ln, then sensed between column C2 and rows L1-Ln, and so on until column Cn and rows L1-Ln. However, it should be appreciated that this is only an example of a suitable scanning sequence and that any suitable scanning sequence may be used.

At each scanning step, a measurement may be taken from the row/column pair that represents the capacitance between the selected row/column pair. For example, the capacitance between the selected row/column pair may be charged to a determined voltage value. The amount of charge stored depends on the capacitance between the row/column pair. The capacitance between the selected row and column may change when an object is touching the touch screen near the intersection area of the row and column and alters the electric field in this region. To determine whether an object is in the vicinity, the stored charge can be read out and converted into a voltage that is then digitized.

Figure 3A:
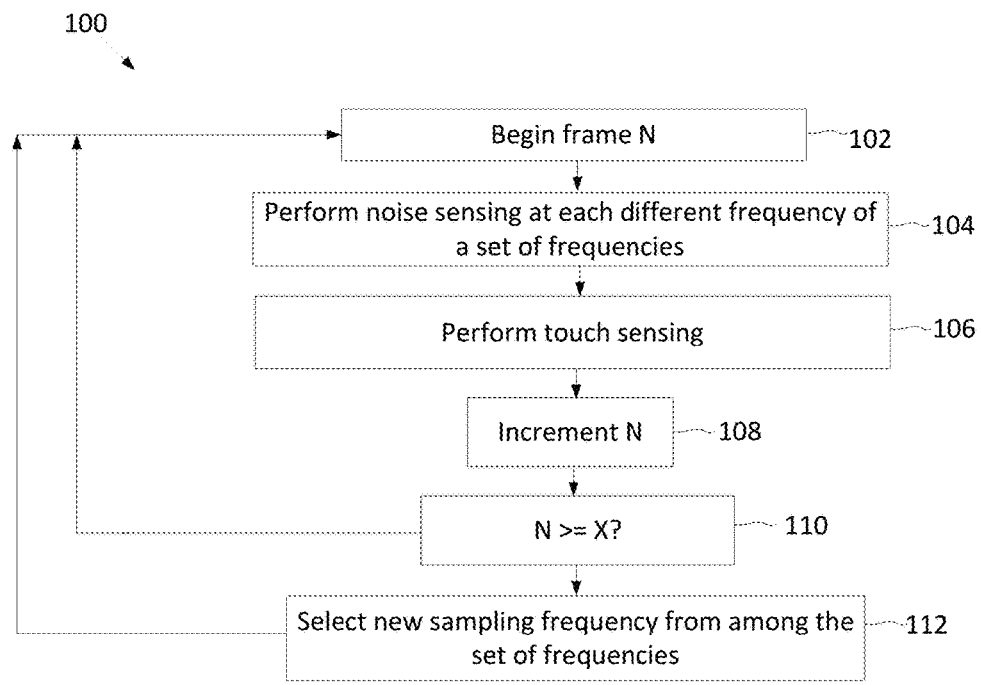
FIG. 3A is a flowchart of a method of operating the touch screen system of FIG. 2.

A detailed technique for operating the touch screen system 20 is now described with reference to flowchart 100 of FIG. 3A. This operation may be performed continuously. After beginning of a given frame N (Block 102), noise sensing for that frame is performed at each different frequency of a set of frequencies (Block 104). Then, touch sensing for that frame is performed (Block 106). The touch sensing may be performed for a longer duration of time than the noise sensing, and more samples may be taken during the touch sensing than during the noise sensing. N is then incremented (Block 108).

If N is not equal to a given frame count X (such as sixteen) at Block 110, the method returns to the beginning of processing for frame N (Block 102). If, however, N is equal to the given frame count X at Block 110, then the method proceeds with selecting a new sampling frequency from among the set of frequencies (Block 112).

Figure 3B:
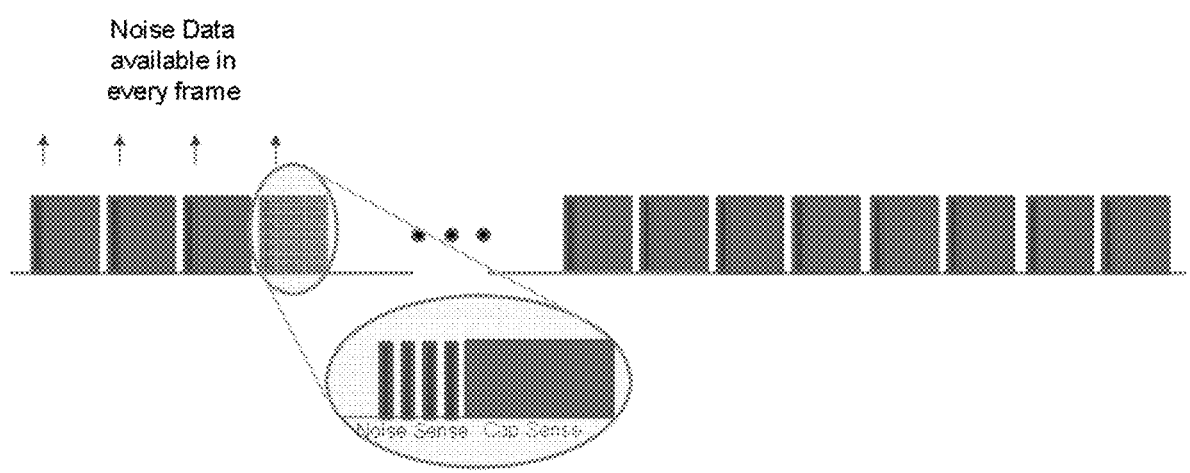
FIG. 3B is a graph showing noise data and touch data calculated for individual frames, according to the method of operating the touch screen system of FIG. 2 shown in the flowchart of FIG. 3A.
Figure 7:
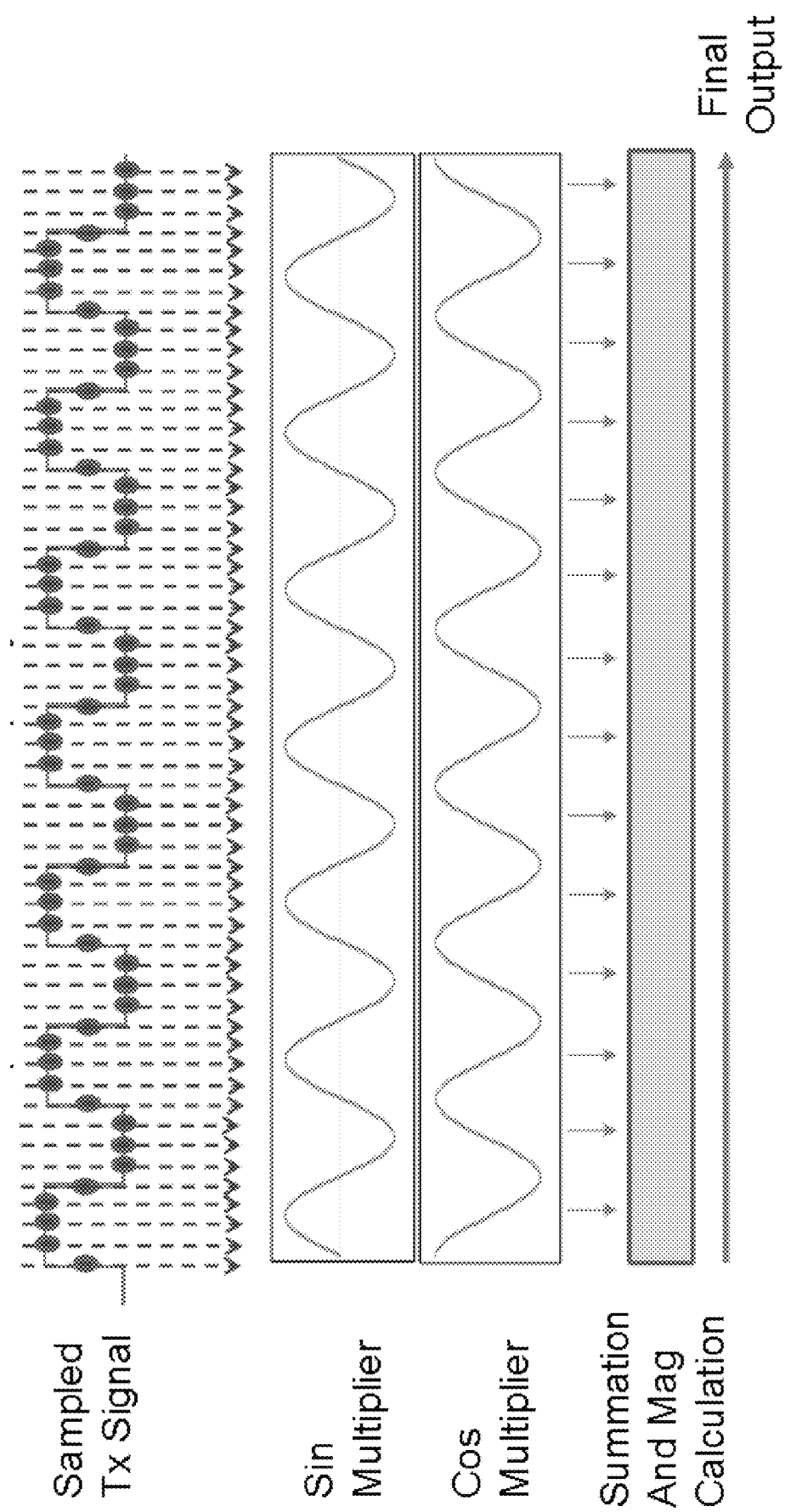
FIG. 7 is a graph showing a sampled signal, and the sine and cosine multipliers to be applied to the sampled signal, according to the method of operating the touch screen system of FIG. 2 shown in the flowchart of FIG. 3A.

This operation is diagrammatically shown in FIG. 3B, which illustrates how each frame contains a noise sensing sub-frame during which the noise sensing is performed, and a touch data sensing sub-frame during which the touch data sensing is performed. The signals involved in this operation are shown in FIG. 7.

Figure 4:
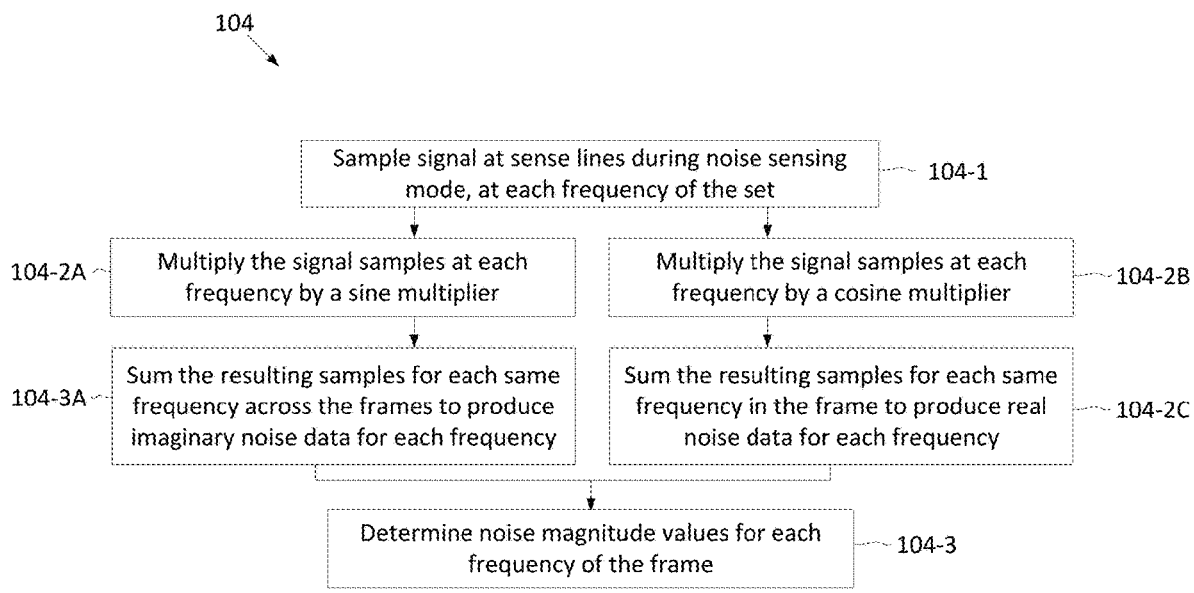
FIG. 4 is a flowchart showing details of operation of the touch screen system of FIG. 2 in the noise sensing mode of FIG. 3A.

Noise sensing is now described with reference to flowchart 104 of FIG. 4. In noise sensing mode, the drive circuitry 32 is controlled so as to not apply a forcing signal to a column conductor (or to a row conductor), however sampling is still performed. At Block 104-1, voltage measurements are sampled at rows or columns acting as sense lines at multiple sampling frequencies (e.g. four different sampling frequencies). After the sampling, the signal samples taken at each frequency within the noise sensing sub-frame of frame N are multiplied by a sine multiplier (Block 104-2A), and then summed for each frequency within the frame N to produce imaginary noise data for each frequency within the frame N (Block 104-3A).

Figure 8:
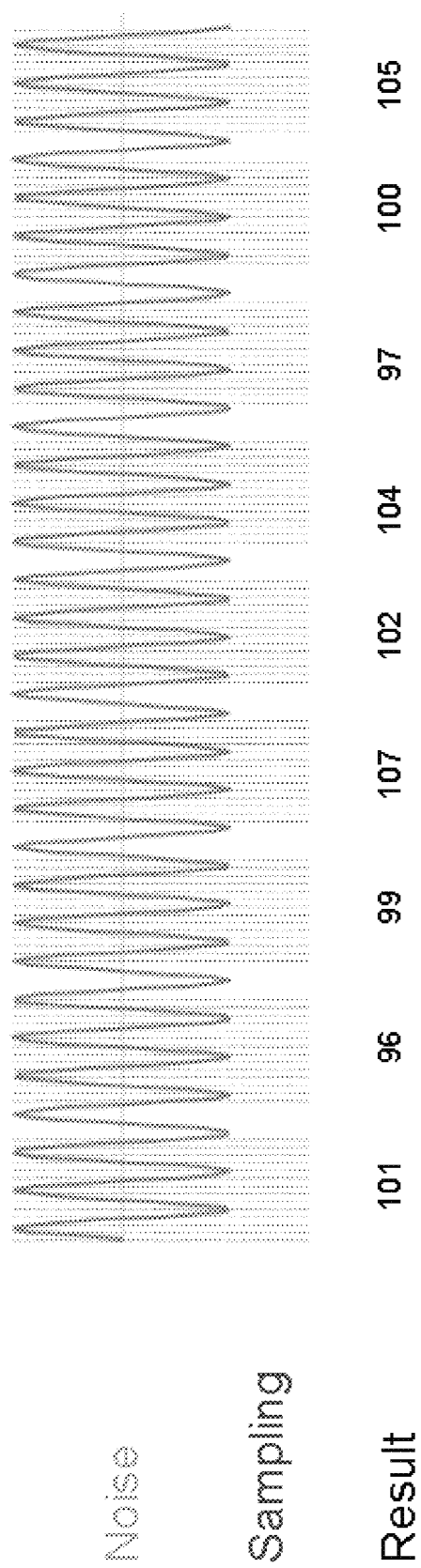
FIG. 8 is a graph showing available noise data in each frame as calculated according to the method of operating the touch screen system of FIG. 2 shown in the flowchart of FIG. 3A.

In addition, separately from the multiplication performed at Block 104-2A, the signal samples taken at each frequency within the noise sensing sub-frame of frame N are multiplied by a cosine multiplier (Block 104-2B), and then summed for each frequency within the frame N to produce real noise data for each frequency (Block 104-2C). A noise magnitude value is determined for each frequency in the frame (Block 104-3) as a function of both the imaginary noise data and the real noise data. It is noted that the sine multiplier and cosine multipliers may be sine and cosine waves, respectively, sampled at double their frequency. The signals involved in this operation are shown in FIG. 8.

Figure 5:
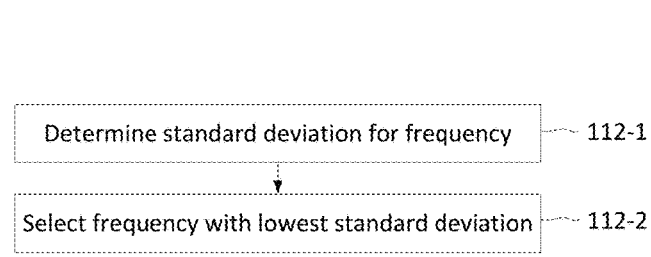
FIG. 5 is a flowchart showing details of operation of the touch screen system of FIG. 2 when selecting a new sampling frequency in the flowchart of FIG. 3A.

Selection of the new sampling frequency for use in the sensing subframe is now described with reference to flowchart 112 of FIG. 5. After N is equal to X, a standard deviation of each frequency across the X frames is determined from the noise magnitude values for those frequencies (Block 112-1). The frequency with the lowest standard deviation is then selected (Block 112-2) for use as a sampling frequency in the next noise sensing sub-frame.

It should be understood that a new sampling frequency may be determined as described, once every sixteen frames, or that it may be determined as described, at every frame N where N is greater than or equal to X.

Figure 6:
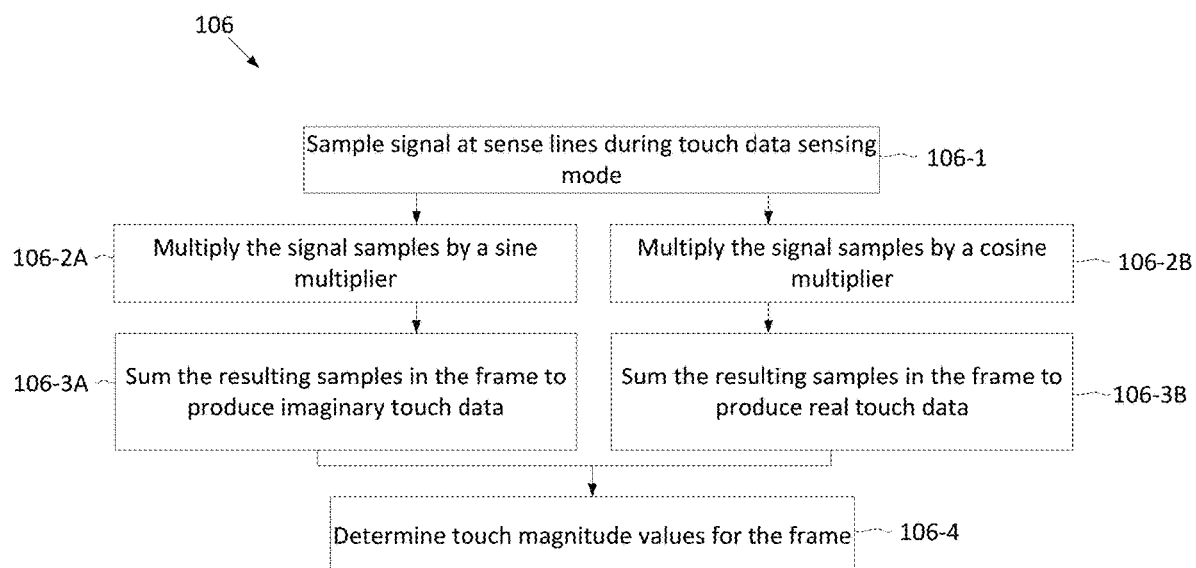
FIG. 6 is a flowchart showing details of operation of the touch screen system of FIG. 2 in the noise sensing mode of FIG. 3A.

Touch sensing is now described with reference to flowchart 106 of FIG. 6. Voltage measurements are sampled at rows or columns acting as sense lines at the current sampling frequency (Block 106-1). Thereafter, the signal samples taken within the frame N are multiplied by a sine multiplier (Block 106-2A), and then summed to produce imaginary touch data (Block 106-3A). In addition, separately from the multiplication performed at Block 106-2A, the signal samples taken within the frame N are multiplied by a cosine multiplier (Block 106-2B), and then summed to produce real touch data (Block 106-3B). From the touch magnitude values, the coordinates of the touch can be determined (Block 106-4).

Using the techniques described above, the noise data in each frame is usable as it does not vary excessively from frame to frame. Since the noise data in each frame is usable, actions taken in response to the noise may be taken more quickly.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method, comprising:
for each of a plurality of frames, placing a touch sensing screen into a noise sensing mode by not driving force lines of the touch sensing screen and sensing noise data at sense lines of the touch sensing screen; and
in a noise sensing sub-frame of each of the plurality of frames, performing the steps of:
(a) sampling the noise data;
(b) performing trigonometric manipulations on the noise data to produce imaginary noise data and real noise data; and
(c) determining a noise magnitude value of the noise data as a function of the imaginary noise data and the real noise data.

2. The method of claim 1, wherein, in each noise sensing sub-frame, steps (a)-(c) are performed for each of a plurality of possible sampling frequencies to be used in a touch data sensing mode.

3. The method of claim 2, further comprising determining a standard deviation of the noise magnitude values, across each of the noise sensing sub-frames, of each of the plurality of possible sampling frequencies.

4. The method of claim 3, further comprising placing the touch sensing screen into the touch data sensing mode and, in a touch data sensing sub-frame of each of the plurality of frames, sampling touch data at the frequency of the plurality of possible sampling frequencies having a lowest standard deviation across each of the noise sensing sub-frames.

5. The method of claim 4, further comprising, in the touch data sensing sub-frame of each of the plurality of frames, performing the steps of:
performing trigonometric manipulations of the touch data to produce imaginary touch data and real touch data; and
determining a magnitude value of the touch data as a function of the imaginary touch data and real touch data.

6. The method of claim 5, further comprising determining coordinates of a touch to the touch sensing screen as a function of the magnitude values for each of the touch data sensing sub-frames.

7. A touch screen controller operable with a touch screen having force lines and sense lines, the touch screen controller comprising:
drive circuitry configured to drive the force lines with a force signal in a touch data sensing mode and to not drive the force lines in a noise sensing mode; and
sense circuitry configured to sense touch data at the sense lines during the touch data sensing mode and to sense noise data at the sense lines during the noise sensing mode;
processing circuitry configured to, in the noise sensing mode, perform the steps of:
(a) sampling the noise data;
(b) performing trigonometric manipulations of the noise data to produce imaginary noise data and real noise data; and
(c) determining a noise magnitude value of the noise data as a function of the imaginary noise data and the real noise data.

8. The touch screen controller of claim 7, wherein the processing circuitry is configured to:
in the noise sensing mode, perform steps (a)-(c) for each of a plurality of possible sampling frequencies to be used in the touch data sensing mode; and
determine which of the plurality of possible sampling frequencies is to be used by the sense circuitry in a later entry into the touch data sensing mode.

9. The touch screen controller of claim 8, wherein the processing circuitry determines which of the plurality of possible sampling frequencies is to be used by the sense circuitry in the later entry into the touch data sensing mode by selecting the frequency of the plurality of possible sampling frequencies that has a lowest standard deviation.

10. The touch screen controller of claim 7, wherein the processing circuitry is configured to, for each of a plurality of data frames, in the noise sensing mode, perform steps (a)-(c) for each of a plurality of possible sampling frequencies to be used in the touch data sensing mode in that data frame so as to determine a noise magnitude value of the noise data in each data frame.

11. The touch screen controller of claim 10, wherein the processing circuitry determines which of the plurality of possible sampling frequencies is to be used by the sense circuitry upon exit of the noise sensing mode and into a later entry into the touch data sensing mode by selecting the frequency of the plurality of possible sampling frequencies that has a lowest standard deviation.

12. The touch screen controller of claim 7, wherein the processing circuitry is configured to, in the touch data sensing mode:
sample the touch data;
perform trigonometric manipulations of the touch data to produce imaginary touch data and real touch data; and
determine a magnitude value of the touch data as a function of the imaginary touch data and real touch data.

13. A touch screen controller operable in a touch data sensing mode and in a noise sensing mode, the touch screen controller comprising:
sense circuitry configured to sense data during both the touch data sensing mode and the noise sensing mode; and
processing circuitry configured, for a plurality of frames:
during a noise sensing sub-frame, perform steps of:
sampling the data at a plurality of different possible sampling frequencies;
performing trigonometric manipulations of the data sampled at each of the plurality of different possible sampling frequencies to produce imaginary and real noise data for each of the plurality of different possible sampling frequencies; and
determining separate noise magnitude values of the data for each of the plurality of different possible sampling frequencies as a function of the imaginary noise data and the real noise data.

14. The touch screen controller of claim 13, wherein the processing circuitry is also configured to perform a step of selecting a sampling frequency for a next frame based upon the separate noise magnitude values of the data for each of the plurality of different possible sampling frequencies of two or more of the plurality of frames.

15. The touch screen controller of claim 13, wherein the processing circuitry is also configured to perform a step of determining a standard deviation of each of the different possible sampling frequencies over two or more of the plurality of frames, based upon the separate noise magnitude values of the data for each of the plurality of different possible sampling frequencies as determined during each of the two or more of the plurality of frames; and wherein the processing circuitry is also configured to perform a step of selecting a sampling frequency for a next frame based upon the standard deviation of each of the different possible sampling frequencies.

16. The touch screen controller of claim 15, wherein the processing circuitry selects the sampling frequency for the next frame based upon which of each of the different possible sampling frequencies has a lowest standard deviation.

17. The touch screen controller of claim 13, wherein the processing circuitry is also configured to, for each frame, during a touch data sensing sub-frame, perform steps of:
   sampling the data at a sampling frequency;
   performing trigonometric manipulations of the data sampled at each of the plurality of different possible sampling frequencies to produce imaginary and real noise data for each of the plurality of different possible sampling frequencies; and
   determining a touch magnitude value of the data as a function of the plurality of different possible sampling frequencies.

* * * * *